(12) United States Patent
Zikeli et al.

(10) Patent No.: US 8,580,167 B2
(45) Date of Patent: Nov. 12, 2013

(54) LYOCELL METHOD COMPRISING AN ADJUSTMENT OF THE PROCESSING DURATION BASED ON THE DEGREE OF POLYMERIZATION

(71) Applicant: Lenzing Aktiengesellschaft, Lenzing (AT)

(72) Inventors: Stefan Zikeli, Regau (AT); Michael Longin, Vocklabruck (AT)

(73) Assignee: Lenzing Aktiengesellschaft, Lenzing (AT)

( * ) Notice: Subject to any disclaimer, the term of this patent is extended or adjusted under 35 U.S.C. 154(b) by 0 days.

(21) Appl. No.: 13/659,649

(22) Filed: Oct. 24, 2012

(65) Prior Publication Data
US 2013/0049244 A1    Feb. 28, 2013

Related U.S. Application Data

(62) Division of application No. 12/776,737, filed on May 10, 2010, now Pat. No. 8,317,503, which is a division of application No. 11/569,061, filed as application No. PCT/EP2005/002088 on Feb. 28, 2005, now abandoned.

(30) Foreign Application Priority Data

May 13, 2004 (DE) .......................... 10 2004 024 030

(51) Int. Cl.
*B29C 47/92* (2006.01)
*D01D 5/06* (2006.01)
(52) U.S. Cl.
USPC ....................... 264/40.1; 264/178 F; 264/187
(58) Field of Classification Search
USPC ................... 264/40.1, 178, 187, 203, 211.14, 264/211.15, 211.24, 233 F
See application file for complete search history.

(56) References Cited

U.S. PATENT DOCUMENTS

| 1,655,433 A | 1/1928 | Morris |
| 1,765,883 A | 6/1930 | Ruschke |

(Continued)

FOREIGN PATENT DOCUMENTS

| AT | 395724 | 2/1993 |
| DE | 218121 | 7/1908 |

(Continued)

OTHER PUBLICATIONS

Brand, O. et al., "Micromachined viscosity sensor for real-time polymerization monitoring," 1997 International Conference on Solid-State Sensors and Actuators, Chicago, Jun. 16-19, 1997 (4 pages).

(Continued)

*Primary Examiner* — Yogendra Gupta
*Assistant Examiner* — Joseph Leyson
(74) *Attorney, Agent, or Firm* — Michael Best & Friedrich LLP

(57) ABSTRACT

The invention relates to a method and a device for producing Lyocell fibers which are extruded from a cellulose solution of water, cellulose and tertiary amine oxide in a spinning head (25). The cellulose solution is obtained in a number of process steps directly from the cellulose (3, 4) or with the formation of a cellulose suspension. Since the degree of polymerization decreases in the course of processing the cellulose through to its extrusion in the cellulose solution, with the processing of celluloses with a low degree of polymerization there is the risk that the endless molded bodies (2) extruded in the spinning head (25) exhibit defective quality. In order to also be able to process celluloses (3, 4) with a low degree of polymerization without having to accept reduced quality, according to the invention, the residence time of the cellulose from its introduction into the device (1) through to the extrusion of the cellulose (3, 4) in the cellulose solution is set in dependence of the degree of polymerization of the cellulose, of the cellulose suspension and/or of the cellulose solution.

13 Claims, 5 Drawing Sheets

(56) References Cited

U.S. PATENT DOCUMENTS

| | | |
|---|---|---|
| 2,179,181 A | 11/1939 | Graenacher et al. |
| 2,518,827 A | 8/1950 | Smith |
| 2,829,891 A | 4/1958 | Ludwig |
| 3,061,402 A | 10/1962 | Sanders |
| 3,404,698 A | 10/1968 | Rouse |
| 3,407,784 A | 10/1968 | Hitt et al. |
| 3,628,321 A | 12/1971 | Schwartz |
| 3,733,059 A | 5/1973 | Pettit |
| 3,924,984 A | 12/1975 | Giacobazzi |
| 3,932,576 A | 1/1976 | Patel |
| 4,033,742 A | 7/1977 | Nichols et al. |
| 4,043,718 A | 8/1977 | Takenaka et al. |
| 4,118,210 A | 10/1978 | Watanabe et al. |
| 4,142,913 A | 3/1979 | McCorsley, III et al. |
| 4,144,080 A | 3/1979 | McCorsley, III |
| 4,193,962 A | 3/1980 | Roberts |
| 4,211,574 A | 7/1980 | McCorsley, III et al. |
| 4,219,040 A | 8/1980 | Fallon et al. |
| 4,246,221 A | 1/1981 | McCorsley, III |
| 4,261,941 A | 4/1981 | Sherman et al. |
| 4,261,943 A | 4/1981 | McCorsley, III |
| 4,263,929 A | 4/1981 | Kearney |
| 4,416,698 A | 11/1983 | McCorsley, III |
| 4,425,293 A | 1/1984 | Vassilatos |
| 4,477,951 A | 10/1984 | Geyer, Jr. et al. |
| 4,529,368 A | 7/1985 | Makansi |
| 4,578,134 A | 3/1986 | Hartmann |
| 4,641,404 A | 2/1987 | Seydel et al. |
| 4,713,290 A | 12/1987 | Kwon et al. |
| 4,802,989 A | 2/1989 | Haruta et al. |
| 4,869,860 A | 9/1989 | Lewis, Jr. |
| 4,960,041 A | 10/1990 | Kiser |
| 5,191,990 A | 3/1993 | Fritts |
| 5,234,651 A | 8/1993 | Kawai |
| 5,252,284 A | 10/1993 | Jurkovic et al. |
| 5,262,099 A | 11/1993 | Adams et al. |
| 5,275,545 A | 1/1994 | Ohyanagi et al. |
| 5,279,629 A | 1/1994 | Stueble |
| 5,362,430 A | 11/1994 | Herold, II et al. |
| 5,518,670 A | 5/1996 | Budenbender et al. |
| 5,540,874 A | 7/1996 | Yamada et al. |
| 5,607,639 A | 3/1997 | Zikeli et al. |
| 5,639,484 A | 6/1997 | White et al. |
| 5,647,889 A | 7/1997 | Stueble |
| 5,658,524 A | 8/1997 | Portnoy et al. |
| 5,709,721 A | 1/1998 | Stueble |
| 5,792,399 A | 8/1998 | Meister et al. |
| 5,868,985 A | 2/1999 | Frischmann |
| 5,942,327 A | 8/1999 | Budgell et al. |
| 5,968,434 A | 10/1999 | Zikeli et al. |
| 5,984,655 A | 11/1999 | Schwenninger et al. |
| 6,036,895 A | 3/2000 | Budenbender et al. |
| 6,117,379 A | 9/2000 | Haynes et al. |
| 6,128,832 A | 10/2000 | Stueble |
| 6,173,767 B1 | 1/2001 | Kennon |
| 6,258,406 B1 | 7/2001 | Enders et al. |
| 6,706,224 B2 | 3/2004 | Firgo et al. |
| 6,755,633 B2 | 6/2004 | Miller |
| 6,902,690 B1 | 6/2005 | Niemz et al. |
| 6,972,102 B1 | 12/2005 | Bauer et al. |
| 7,115,187 B1 | 10/2006 | Bauer et al. |
| 7,204,265 B2 | 4/2007 | Zikeli et al. |
| 7,364,681 B2 | 4/2008 | Zikeli et al. |
| 8,317,503 B2 | 11/2012 | Zikeli et al. |
| 2002/0025433 A1 | 2/2002 | Chang et al. |
| 2002/0086072 A1 | 7/2002 | Allen et al. |
| 2003/0025252 A1 | 2/2003 | Sealey et al. |
| 2003/0141251 A1 | 7/2003 | Ji et al. |
| 2004/0081905 A1 | 4/2004 | Moribe et al. |
| 2005/0048151 A1 | 3/2005 | Zikeli et al. |
| 2005/0220916 A1 | 10/2005 | Zikeli et al. |
| 2006/0055078 A1 | 3/2006 | Zikeli et al. |
| 2006/0083918 A1 | 4/2006 | Zikeli et al. |
| 2006/0144062 A1 | 7/2006 | Zikeli et al. |
| 2008/0048358 A1 | 2/2008 | Zikeli et al. |
| 2010/0219547 A1 | 9/2010 | Zikeli et al. |
| 2013/0049244 A1* | 2/2013 | Zikeli et al. .......... 264/40.1 |

FOREIGN PATENT DOCUMENTS

| | | |
|---|---|---|
| DE | 858005 | 12/1952 |
| DE | 2011493 | 10/1970 |
| DE | 2014828 | 10/1970 |
| DE | 2732012 | 1/1978 |
| DE | 3611947 | 10/1987 |
| DE | 4219658 | 12/1993 |
| DE | 4306925 | 9/1994 |
| DE | 4309416 | 10/1994 |
| DE | 4312219 | 10/1994 |
| DE | 4409609 | 10/1994 |
| DE | 69425098 | 3/1995 |
| DE | 4419441 | 12/1995 |
| DE | 4426966 | 2/1996 |
| DE | 4439149 | 5/1996 |
| DE | 4419440 | 6/1996 |
| DE | 19504316 | 8/1996 |
| DE | 29504127 | 8/1996 |
| DE | 19511151 | 10/1996 |
| DE | 19753806 | 6/1998 |
| DE | 19717257 | 10/1998 |
| DE | 19721609 | 11/1998 |
| DE | 19837210 | 11/1999 |
| DE | 19915235 | 10/2000 |
| DE | 19924508 | 11/2000 |
| DE | 10023391 | 3/2001 |
| DE | 10037923 | 3/2001 |
| DE | 10016307 | 10/2001 |
| DE | 10019660 | 11/2001 |
| DE | 10029044 | 1/2002 |
| DE | 10206089 | 2/2002 |
| DE | 10060877 | 7/2002 |
| DE | 10060879 | 7/2002 |
| DE | 10200405 | 8/2002 |
| DE | 10223268 | 1/2003 |
| DE | 10314878 | 4/2003 |
| DE | 10200406 | 7/2003 |
| DE | 10204381 | 8/2003 |
| DE | 69913117 | 8/2004 |
| EP | 0172001 | 2/1986 |
| EP | 0356419 | 2/1990 |
| EP | 0494851 | 7/1992 |
| EP | 584318 | 3/1994 |
| EP | 0626198 | 11/1994 |
| EP | 0641877 | 3/1995 |
| EP | 0662204 | 7/1995 |
| EP | 0662264 | 7/1995 |
| EP | 0789822 | 8/1997 |
| EP | 0818469 | 1/1998 |
| EP | 0853146 | 7/1998 |
| EP | 0789790 | 1/1999 |
| GB | 1311146 | 3/1973 |
| GB | 2007147 | 5/1979 |
| GB | 1583265 | 1/1981 |
| JP | 59-228012 | 12/1984 |
| JP | 64-52809 | 2/1989 |
| JP | 03-076822 | 4/1991 |
| WO | WO 93/19230 | 9/1993 |
| WO | WO 94/06530 | 3/1994 |
| WO | WO 94/08162 | 4/1994 |
| WO | WO 94/18983 | 9/1994 |
| WO | WO 94/20656 | 9/1994 |
| WO | WO 94/28210 | 12/1994 |
| WO | WO 94/28215 | 12/1994 |
| WO | WO 94/28218 | 12/1994 |
| WO | WO 94/28219 | 12/1994 |
| WO | WO 95/01470 | 1/1995 |
| WO | WO 95/01473 | 1/1995 |
| WO | WO 95/04173 | 2/1995 |
| WO | WO 95/05173 | 2/1995 |
| WO | WO 95/08010 | 3/1995 |
| WO | WO 95/11261 | 4/1995 |
| WO | WO 96/07777 | 3/1996 |
| WO | WO 96/17118 | 6/1996 |

(56) References Cited

FOREIGN PATENT DOCUMENTS

| | | |
|---|---|---|
| WO | WO 96/18760 | 6/1996 |
| WO | WO 96/20300 | 7/1996 |
| WO | WO 96/21758 | 7/1996 |
| WO | WO 96/27035 | 9/1996 |
| WO | WO 96/30566 | 10/1996 |
| WO | WO 96/33221 | 10/1996 |
| WO | WO 96/33934 | 10/1996 |
| WO | WO 96/38625 | 12/1996 |
| WO | WO 97/33020 | 9/1997 |
| WO | WO 98/05702 | 2/1998 |
| WO | WO 98/18983 | 5/1998 |
| WO | WO 98/19230 | 5/1998 |
| WO | WO 98/28218 | 7/1998 |
| WO | WO 99/00185 | 1/1999 |
| WO | WO 99/16948 | 4/1999 |
| WO | WO 00/06813 | 2/2000 |
| WO | WO 01/25516 | 4/2001 |
| WO | WO 01/27161 | 4/2001 |
| WO | WO 01/58960 | 8/2001 |
| WO | WO 01/68958 | 9/2001 |
| WO | WO 01/70819 | 9/2001 |
| WO | WO 01/74906 | 10/2001 |
| WO | WO 01/88232 | 11/2001 |
| WO | WO 01/88419 | 11/2001 |
| WO | WO 01/96636 | 12/2001 |
| WO | WO 03/057951 | 7/2003 |
| WO | WO 03/057952 | 7/2003 |
| WO | WO 03/064735 | 8/2003 |
| WO | WO 03/069200 | 8/2003 |
| WO | WO 03/080906 | 10/2003 |
| WO | WO 03/100140 | 12/2003 |
| WO | WO 2004/088010 | 10/2004 |
| WO | WO 2005/113868 | 12/2005 |
| WO | WO 2005/113869 | 12/2005 |
| WO | WO 2005/113870 | 12/2005 |

OTHER PUBLICATIONS

Buijtenhuijs, F.A. et al., "The degradation and stabilization of cellulose dissolved in N-methylmorpholine-n-oxide (NMMNO)," Papier 40:12 (1986) 615-619.

Jing, Y., "To improve the quality of feeding air of a spinning air conditioner," Jinshan Oil and Chemical Fibers (2000) 3:35-38 (translation attached).

Reay, R.J. et al., "Microfabricated electrochemical analysis system for heavy metal detection," Sensors and Actuators B (1996) 34:450-455.

Schurz et al., "Was Ist Neu an Den Neuen Fasern Der Gattung Lyocell," (What is new in the new fibres of the lyocell Type?), Lenzinger Berichte (Lenzinger Reports) Sep. 1994, pp. 37-40.

Weigel et al., "Strukturbildung von Cellulosefasern Aus Aminoxidlosungen," (Structure formulation of cellulose fibres from amine oxide solutions), Lenzinger Berichte (Lenzinger Reports), Sep. 1994 pp. 31-35.

Taschenbuch fur Heizung- and Klimatechnik 68, Auflage 1997/1998, Recknagel-Sprenger-Schramek, ISBN 3-486-26214-9, pp. 1073, 1074, 1247, 1248, 1438, 1613, 1615.

International Search Report for Application No. PCT/EP2002/012591 issued on Mar. 27, 2003 (2 pages).

International Preliminary Examination Report for Application No. PCT/EP2002/012591 issued Dec. 30, 2003 with translation (7 pages).

International Search Report for Application No. PCT/EP2002/012592 issued Mar. 27, 2003 (2 pages).

International Preliminary Examination Report for Application No. PCT/EP2002/012592 issued Dec. 22, 2003 with translation (20 pages).

International Search Report for Application No. PCT/EP2002/012593 issued Apr. 15, 2003 (2 pages).

International Preliminary Examination Report for Application No. PCT/EP2002/012593 issued Apr. 30, 2004 with translation (12 pages).

International Search Report for Application No. PCT/EP2002/12595 issued Mar. 26, 2003 (3 pages).

International Preliminary Examination Report for Application No. PCT/EP2002/12595 issued Jun. 7, 2004 with translation (10 pages).

International Search Report for Application No. PCT/EP2003/002426 issued Jul. 17, 2003 (2 pages).

International Preliminary Examination Report for Application No. PCT/EP2003/002426 issued Oct. 1, 2003 with translation (4 pages).

International Search Report for Application No. PCT/EP03/02946 issued on Jul. 29, 2003 (3 pages).

International Search Report for Application No. PCT/EP2004/001268 issued on Oct. 14, 2004 (3 pages).

International Preliminary Report on Patentability for Application No. PCT/EP2004/001268 issued Feb. 7, 2005 with translation (19 pages).

International Search Report for Application No. PCT/EP2005/002138 issued on Jun. 29, 2005 (2 pages).

International Preliminary Report on Patentability for Application No. PCT/EP2005/002138 issued Jul. 31, 2006 with translation (9 pages).

International Search Report for Application No. PCT/EP2005/002097 issued on Jun. 15, 2005 (2 pages).

International Preliminary Report on Patentability for Application No. PCT/EP2005/002097 issued on Aug. 4, 2006 with translation (16 pages).

International Search Report for Application No. PCT/EP2005/002088 issued on Jun. 13, 2005 (2 pages).

Written Opinion for Application No. PCT/EP2005/002088 issued on Jun. 13, 2005 with translation (9 pages).

United States Office Action for U.S. Appl. No. 10/500,998 dated May 23, 2005 (5 pages).

United States Office Action for U.S. Appl. No. 10/500,998 dated Jan. 25, 2006 (9 pages).

United States Office Action for U.S. Appl. No. 10/500,998 dated Jul. 5, 2006 (7 pages).

United States Office Action for U.S. Appl. No. 10/500,998 dated Feb. 28, 2007 (7 pages).

United States Office Action for U.S. Appl. No. 10/500,917 dated Jan. 9, 2008 (18 pages).

United States Office Action for U.S. Appl. No. 10/500,917 dated Jan. 29, 2009 (14 pages).

United States Office Action for U.S. Appl. No. 10/500,917 dated Jun. 15, 2009 (17 pages).

United States Office Action for U.S. Appl. No. 10/900,518 dated Jul. 24, 2006 (13 pages).

United States Office Action for U.S. Appl. No. 10/900,518 dated Jan. 25, 2007 (11 pages).

United States Office Action for U.S. Appl. No. 10/900,518 dated Oct. 18, 2007 (10 pages).

United States Office Action for U.S. Appl. No. 10/900,518 dated Jun. 26, 2008 (13 pages).

United States Office Action for U.S. Appl. No. 10/900,518 dated Jan. 26, 2009 (12 pages).

United States Office Action for U.S. Appl. No. 10/918,120 dated Nov. 25, 2005 (11 pages).

United States Office Action for U.S. Appl. No. 10/508,394 dated Jan. 29, 2009 (11 pages).

United States Patent Office Action for U.S. Appl. No. 10/508,394 dated Jun. 14, 2010 (10 pages).

United States Patent Office Action for U.S. Appl. No. 10/508,394 dated Feb. 2, 2011 (10 pages).

United States Patent Office Action for U.S. Appl. No. 10/508,394 dated Jul. 19, 2011 (14 pages).

United States Patent Office Action for U.S. Appl. No. 10/508,394 dated May 8, 2012 (12 pages).

United States Office Action for U.S. Appl. No. 10/515,880 dated Feb. 19, 2008 (8 pages).

United States Office Action for U.S. Appl. No. 10/515,880 dated Jun. 5, 2009 (11 pages).

United States Office Action for U.S. Appl. No. 11/240,993 dated Jul. 22, 2008 (13 pages).

(56) References Cited

OTHER PUBLICATIONS

United States Office Action for U.S. Appl. No. 10/569,061 dated Jul. 22, 2009 (9 pages).
United States Office Action for U.S. Appl. No. 11/569,058 dated Sep. 15, 2009 (14 pages).
United States Office Action for U.S. Appl. No. 11/569,061 dated Jan. 13, 2010 (10 pages).
United States Patent Office Action for U.S. Appl. No. 12/776,737 dated Mar. 3, 2011 (9 pages).
United States Patent Office Action for U.S. Appl. No. 12/776,737 dated Oct. 28, 2011 (9 pages).

* cited by examiner

LYOCELL METHOD COMPRISING AN ADJUSTMENT OF THE PROCESSING DURATION BASED ON THE DEGREE OF POLYMERIZATION

CROSS-REFERENCE TO RELATED APPLICATIONS

This patent application is divisional of U.S. application Ser. No. 12/776,737, filed 10 May 2010, which is a divisional of U.S. application Ser. No. 11/569,061, filed 23 Jan. 2007, which is a national stage filing under 35 U.S.C. 371 of International Application No. PCT/EP2005/002088, filed 28 Feb. 2005, which claims foreign priority to German Patent Application No. 10 2004 024 030.2, filed 13 May 2004, each of which is incorporated by reference herein in its entirety for any purpose.

BACKGROUND OF THE INVENTION

The invention relates to a method of producing Lyocell fibres, in which a cellulose is introduced with a predetermined degree of polymerisation, and from the cellulose, with the addition of a treatment medium, a cellulose solution or initially a cellulose suspension and from this then the cellulose solution is produced, and in which the cellulose solution is extruded to form endless moulded bodies.

The invention also relates to a device for the production of Lyocell fibres with a mixing device to which a cellulose can be fed and in which a cellulose solution, with the addition of a treatment medium, directly or with the formation of a cellulose suspension can be processed, with a spinning head, through which the cellulose solution can be extruded to form endless moulded bodies, and with a conveying device, through which the cellulose suspension and/or the cellulose solution can be conveyed from the mixing device to the spinning head.

These types of methods and devices are known from the Lyocell technology. With the Lyocell technology threads, fibres, films and membranes are extruded as endless moulded bodies from the spinning mass containing cellulose, water and tertiary amine oxide. Due to its environmental compatibility, the Lyocell technology is increasingly replacing the conventional viscose methods. The environmental compatibility of the Lyocell method is based on the solution of the cellulose without derivatisation in an organic, aqueous solvent. From this cellulose solution endless moulded bodies are extruded, for example fibres and films. Through the extrusion of the moulded bodies and the orientation and regeneration of the cellulose in the course of the extrusion moulded bodies of high strength are obtained with versatile possible uses in the textile and non-textile sector. The name Lyocell was issued by the BISFA (International Bureau for the Standardisation of Man-made Fibres). In the state of the art, the Lyocell method is now well documented.

Tertiary amine oxides are known as solvents for cellulose from U.S. Pat. No. 2,179,181 which can dissolve cellulose without derivatisation. From these solutions, the cellulose moulded bodies can be obtained by precipitation.

The processing of the cellulose, dissolved in an aqueous amine oxide, particularly N-methylmorpholine-N-oxide (NMMNO), is however problematical with regard to safety, because the degree of polymerisation of the cellulose on dissolving the cellulose in NMMNO decreases. In addition, amine oxides generally exhibit only limited thermal stability, particularly in the system NMMNO/cellulose/water, and have a tendency to spontaneous exothermic reaction. To overcome these problems and to be able to manufacture Lyocell fibres economically, there is a series of methods for solution in the state of the art.

In U.S. Pat. No. 4,144,080, it is stated that at high temperatures the cellulose dissolves more quickly in a tertiary amine-N-oxide and forms a more homogeneous solution if the cellulose together with the preferred ingredients of tertiary amine-N-oxide and water is milled. In WO-94/28219, a method for the production of a cellulose solution is described in which milled cellulose and an amine oxide solution are placed in a horizontal, cylindrical mixing chamber. The mixing chamber exhibits axially spaced stirring elements that are rotating around its longitudinal axis. Apart from NMMNO, N-methylpiperidine-N-oxide, N-methylpyrolidone oxide, dimethylcyclohexylamine oxide and others can be used as the amine oxide. Mixing in the mixing chamber occurs between 65° C. and 85° C. According to WO-A-98/005702, the cellulose is mixed in a device with the aqueous solution of the tertiary amine oxide, whereby the mixing device exhibits a mixing tool and a container which rotates during mixing.

In WO-A-98/005702, the mixing tool is improved such that it is formed as a paddle, rail or helix and during mixing preferably prevents the formation of deposits on the inner surface of the container. In WO-A-96/33934, a buffer device is described, which comprises a mixing vessel and a conveying screw as a discharging device. In this way, a continuous production of the cellulose solution is facilitated despite the cellulose being fed in batches.

The method of WO-A-96/33934 has been further developed by the method of WO-96/33221, in which a homogeneous cellulose suspension is produced from pulverised cellulose and an aqueous amine oxide solution in one single step. For this purpose, the pulverised cellulose is brought into contact with the liquid, aqueous tertiary amine oxide and a first mixture is formed in this way. The first mixture is spread in layers on a surface and transported under intensive mixing over this surface. This process can be carried out continuously. Other methods in which the cellulose solution is treated in the form of a thin layer are also known from EP-A-0356419, DE-A-2011493 and WO-A-94/06530.

Also the pulverisation of the cellulose itself is an object of patent publications. For example, U.S. Pat. No. 4,416,698 mentions it as an advantage if the cellulose is milled to a particle size of less than 0.5 mm. In WO-A-95/11261, prepulverised cellulose is introduced into an aqueous solution of a tertiary amine oxide to produce a first suspension. This first suspension is then milled and converted into a formable cellulose solution with the application of heat and a reduced pressure. In order to feed back the dust arising from milling or pulverising the cellulose into the process, filters are used in WO-A-94/28215 through which the cellulose dust is separated from the air. In WO-A-96/38625 a system is described which can pulverise both cellulose bales as well as cellulose in leaf form. For this purpose, an ejection hopper is provided which opens into a device for prepulverising the cellulose.

In EP-B-0818469, it is suggested that cellulose is dispersed in aqueous amine oxide solutions and the dispersion thus obtained treated with xylanases.

Apart from these efforts to economically produce a homogeneous cellulose solution capable of being spun, there are also attempts to overcome the problem of the decomposition phenomena of the cellulose solution which occur spontaneously under an exothermic reaction. In Buijtenhuis et al., The Degradation and Stabilisation of Cellulose Dissolved in NMMNO, in: Papier 40 (1986) 12, 615-618, investigation results are described, according to which metals appear to reduce the decomposition temperatures of the NMMNO in the cellulose solution. Primarily, iron and copper appear to speed up the decomposition of NMMNO. Other metals, such as for example nickel or chrome, also exert a negative influence on the decomposition properties of the cellulose solution in appropriate occurrence and appropriate concentration, if they are present in appropriate concentrations. However, in WO-A-94/28210 stainless steel is still used as the material for a spinning head in order to withstand the high pressures during the extrusion of the cellulose solution.

In addition, the system NMMNO/cellulose/water in the highly concentrated NMMNO region has the property of releasing metal ions from the process apparatus, such as lines, filters, and pumps, which reduces the system stability. In WO-A-96/27035, a method for the production of cellulose moulded bodies is described in which at least some of the materials in contact with the cellulose solution contain at least 90% of an element from the group of titanium, zirconium, chrome and nickel down to a depth of at least 0.5 μm. The important aspect with regard to WO-A-96/27035 is that the rest of the composition of the apparatus and piping, where it comes into contact with the cellulose solution, does not contain any copper, molybdenum, tungsten or cobalt. According to WO-A-96/27035, this measure should prevent exothermic decomposition reactions.

Finally, in DE-C-198 37 210, which is taken as the closest state of the art, a homogeneous cellulose solution is produced irrespective of the water content of the cellulose used. In contrast to current methods, here the cellulose is first transported through an initial shear zone in the absence of NMMNO under homogenisation in a pulper and is only then added to a low water-content NMMNO.

Another way of producing the cellulose solution is followed in DE-A-44 39 149 which forms the closest state of the art. According to the method of DE-A-44 39 149, the cellulose is pretreated enzymatically. To increase the effectiveness of the enzymatic pretreatment, the cellulose can be disintegrated before the pretreatment under shearing in water. Then, the pretreated cellulose is separated from the liquor and the separated cellulose is introduced into a melt of NMMNO and water. Hereby, the separated liquor can practicably be fed back to the pretreatment after supplementing the water and enzyme losses. However, in practice, this type of process management has proven to be impracticable, because the cellulose solution obtained in this way is unstable.

Despite these various approaches to obtaining a homogeneous and stable cellulose solution and to convey it through to the extrusion openings, while avoiding exothermic decomposition reactions, the environmentally friendly and economical production of a homogeneous cellulose solution and its stability remain problematical. Furthermore, it is problematical that the cellulose solution ages, which is expressed in an increasing reduction in the degree of polymerisation with time. With some celluloses which are supplied with already a low degree of polymerisation and are processed to form a spinning mass, ageing may lead to unacceptable reductions in quality.

SUMMARY OF THE INVENTION

The object of the invention is therefore to improve the known methods and devices of the Lyocell technology such that, with the highest environmental compatibility, the method can be implemented independent of the type of cellulose used in a stable manner and with consistently constant quality.

This object is solved for the aforementioned method in that the degree of polymerisation of the cellulose, the cellulose suspension and/or the cellulose solution is monitored and that, in dependence of the determined degree of polymerisation, the residence period of the cellulose from its introduction to its extrusion is set.

For the aforementioned device, this object is solved according to the invention by a monitoring device, through which a degree of polymerisation of the cellulose, the cellulose suspension and/or the cellulose solution can be monitored during the operation of the device, and by a control device, through which the processing duration from the introduction of the cellulose to its extrusion in the spinning head can be set in dependence of the measured degree of polymerisation.

The solution according to the invention is simple and enables any type of cellulose to be used in the production of Lyocell fibres irrespective of its degree of polymerisation. Due to the control, according to the invention, of the processing or residence duration of the cellulose from its pulping through to its extrusion to give endless moulded bodies, a uniform quality of the Lyocell fibres is obtained irrespective of the degree of polymerisation of the processed cellulose. Since additionally, the degree of polymerisation is monitored according to the invention during the processing of the cellulose, it is no longer necessary to only process carefully selected celluloses. According to the invention, any cellulose can now be processed, because a change of the degree of polymerisation in the cellulose, the cellulose suspension and/or the cellulose solution during the processing can be acquired and the processing duration adapted accordingly.

The method according to the invention and the device according to the invention can both be used with the Lyocell method in which the cellulose is directly pulped in an aqueous solution of a tertiary amine oxide or in a tertiary amine oxide and cellulose solution is produced from it, and also with methods in which first a cellulose suspension is produced containing essentially water and cellulose and only then is a tertiary amine oxide or an aqueous solution of it added to form a cellulose solution.

In an advantageous embodiment of the method according to the invention, the cellulose or the cellulose suspension is subjected to an enzymatic pretreatment. In the course of the enzymatic pretreatment a liquid enzyme preparation can, for example, be added in the ratio of 200:1 referred to the cellulose content. As the liquid enzymatic preparation, a cellulase enzyme complex, for example Cellupract AL70 from the company Biopract GmbH, or Cellusoft from the company Novo Nordisk, can be used. To prevent a too strong reduction in the degree of polymerisation, in particular when celluloses with low initial degrees of polymerisation are processed to form Lyocell fibres, in an advantageous embodiment the duration of the enzymatic pretreatment can be set in dependence of the degree of polymerisation of the introduced cellulose. In addition, the degree of polymerisation can also be monitored during the enzymatic pretreatment and the duration of the enzymatic pretreatment can be shortened if the degree of polymerisation is strongly reduced. The enzymatic pretreatment can be carried out in a pulper.

In order to monitor the polymerisation decomposition in an agitating machine, in particular during the production of the cellulose suspension and/or during the enzymatic pretreatment, the known parameters (Newton's number, Reynold's number, Froude's number) in the agitating technology can first be determined. Furthermore, the concentrations, temperatures, mixing times and the mixing quality can be accurately observed and determined in order to obtain information about the decomposition behaviour during the formation of the emulsion or suspension. The temperature control can be carried out via temperature measurement devices, e.g. of type Pt100. The exact concentration can be set using continuous flow measurement devices for the emulsion or suspension agent. The cellulose can be accurately measured using a differential dosage weighing system and similarly continuously charged.

The suspension criteria, such as filling level, agitation duration and concentration of the emulsion/suspension particles over the container height can be determined by the insertion of a measurement sampling lance into the suspension vessel or pulper or into the agitating machine and by the sampling of suspended material. It has been found to be particularly advantageous if the form of the bottom of the suspension vessel is realised as a dished or spherical bottom.

An impeller agitator is preferably used as the stirring element. However, propellers, inclined blade mixers, disc mixers, toothed stirrers, anchor stirrers as well as spiral stirrers or coaxial agitating machines can also be used. The shaft of the stirring machine which is connected to a drive motor is controlled and monitored for speed. Similarly, the monitoring of the drive power, the input energy and the torque takes place during the emulsion and suspension processes for the control of the enzymatic breakdown of the cellulose and thus for the control of the degree of polymerisation using at least one sensor.

Surprisingly, it was found that during the addition of the enzyme, decomposition of the polymer chains took place and the rate of decomposition could be derived via the input emulsifying and suspension power or from power input by an agitating machine.

The degree of polymerisation of the cellulose, the cellulose suspension and/or the cellulose solution can be determined by inline sensors such as torque sensors with associated software and control with computation of the relative reduction in viscosity. These types of systems are, for example, offered by the company PORPOISE. Alternatively, the degree of polymerisation can be determined by manual sample extraction followed by analytical determination of the degree of polymerisation, which however reduces the degree of automation for the method.

As inline sensors, for example strain gauges, fitted between the drive motor and agitating machine or eddy current sensors, can be used for the measurement of power and torque. The eddy current measurement is based on the principle that the permeability for magnetic field lines is modified by mechanical stresses. The magnetic field generated by a stationary sensor head penetrates the agitator drive shaft and induces electrical voltages in the secondary coils of the sensor head in relation to the mechanical stress which are proportional to the torque. The measurement takes place without contact and free of any reactive forces.

A prerequisite for the use of this method in the suspension production system is that a free, accessible piece of the shaft is available on the drive side of the agitating machine to which the sensor can be aligned.

After a manual extraction of the sample, the degree of polymerisation can be determined via the viscosity according to the cuoxam method. The measurements and the measurement signals from the inline sensors are calibrated with the analytical results, correlated and are used for the process control and are to be preferred over a manual sample extraction, because they facilitate the automation of the control of the residence duration.

During the processing of celluloses with a low degree of polymerisation, for example with a DP value of at the most 550, the enzymatic pretreatment is realised over a shorter time period than for a cellulose with a higher degree of polymerisation, for example of at least DP 700.

The enzymatic pretreatment can last between 20 minutes and 80 minutes, whereby the degree of polymerisation after the termination of the enzymatic pretreatment does not drop below a DP value of 520. If the DP value falls below 520, the enzymatic pretreatment is terminated. Then follows the production of the cellulose solution through the vaporisation of water from the enzymatically broken down cellulose and the aqueous tertiary amine oxide. Also in this process step further DP breakdown can be monitored via inline sensors such as for example an inline viscosity device, e.g. from Porpoise, and can be controlled in conjunction with the enzymatic DP breakdown behaviour. In this respect the rheometer is mounted in a branch of the pipe carrying the mass. Thus, a very fast online measurement with high precision is obtained. Through the measurement of the viscosity, the viscous flow, structural viscosity, polymer swelling properties, elasticity and normal stresses can be derived, which in turn can be used for the control of the enzymatic breakdown.

In a further advantageous embodiment, the cellulose solution can be transported to the spinning head by a heated pipe system. Since a reduction in the degree of polymerisation also occurs in the course of this transport, the transport speed of the cellulose solution in the pipe system can be set in relation to the degree of polymerisation of the cellulose solution, of the preceding cellulose suspension and/or the introduced cellulose which is dissolved in the cellulose solution. The lower the degree of polymerisation of the cellulose solution, the faster the cellulose solution is transported to the spinning head according to the invention in order to prevent the extrusion of endless moulded bodies with a degree of polymerisation which is too low. The duration of processing the cellulose solution until its extrusion can be set in a particularly easy way in an advantageous embodiment in that the transport speed of a pump arrangement transporting the cellulose suspension and/or cellulose solution is set in relation to the degree of polymerisation.

The processing duration of the cellulose from its introduction through to its extrusion to form endless moulded bodies is preferably set such that it is at the most 80 minutes and/or at least 20 minutes. In this time frame, a good solution of the cellulose in the tertiary amine oxide can be achieved and at the same time the degree of polymerisation cannot fall below values which lead to an impaired quality of the Lyocell fibres.

In the following, an embodiment of the invention is described as an example, with reference to the drawings. Here, features, as related to versions of the above individual advantageous embodiments of the invention, can be arbitrarily combined with one another as required or also omitted. In addition, the invention is documented based on experimental examples.

BRIEF DESCRIPTION OF THE DRAWINGS

It is shown in.

DETAILED DESCRIPTION

Figure 1:
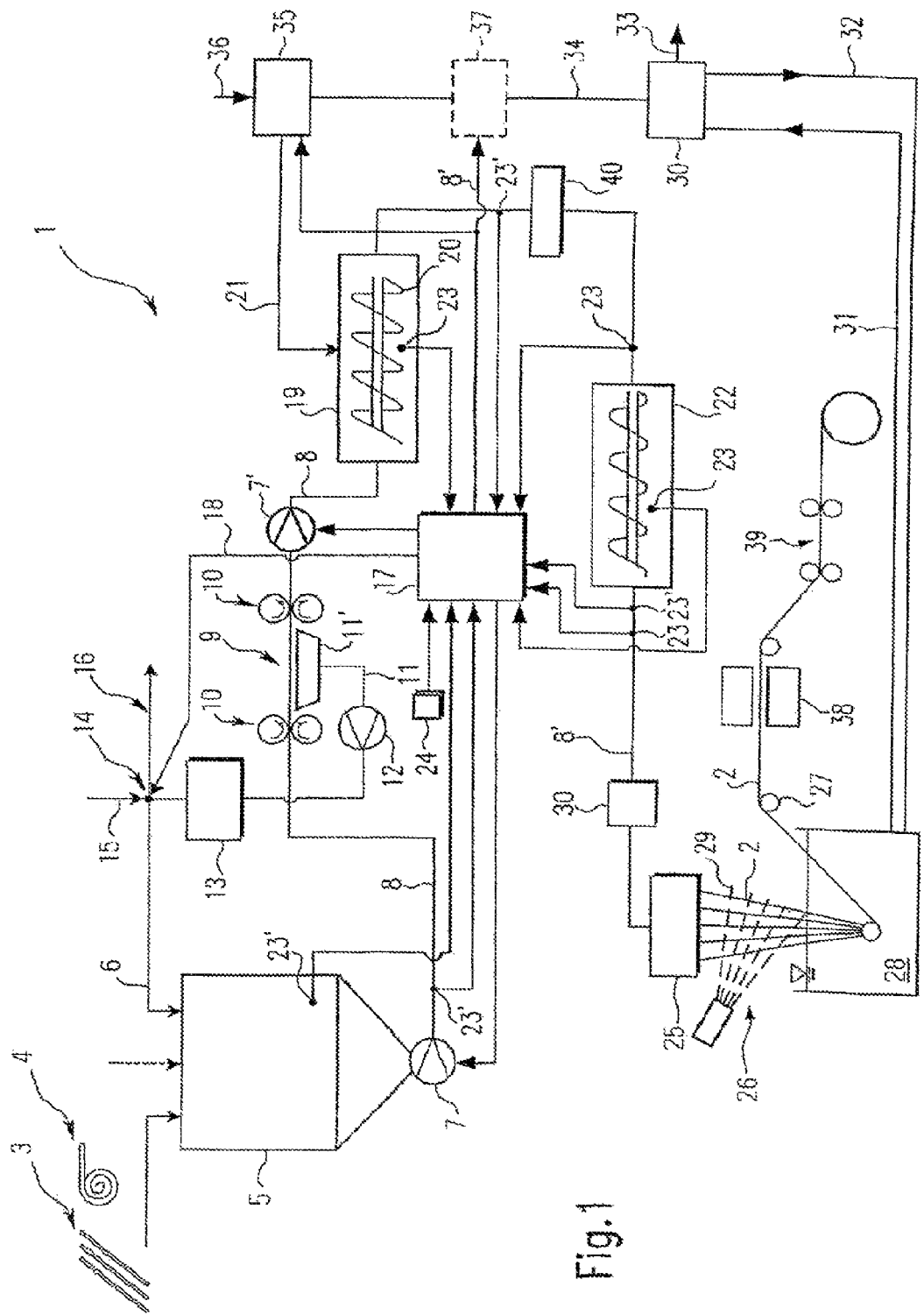
FIG. 1 an embodiment of a device according to the invention for the production of a cellulose solution in a schematic illustration, whereby the method according to the invention can be implemented.

FIG. 1 shows a plant 1 for the production of endless moulded bodies 2, for example spinning filaments, from a spinnable cellulose solution containing water, cellulose and tertiary amine oxide.

First, cellulose in the form of leaves or plates 3 and/or rolls 4 is passed to a pulper 5 in batches. In the pulper 5, the cellulose 3, 4 is treated with water as a treatment medium, symbolically represented by the arrow 6, and a cellulose suspension is formed, preferably still without solvent or amine oxide. Enzymes or enzyme solutions can be added for the homogenisation and stabilisation of the cellulose suspension.

The quantity of the added water 6 is determined in relation to the water content of the cellulose. Typically the water content of the cellulose used is between 5 and 15 percent by mass. This variation is compensated by changing the addition of water appropriately, so that the water content of the cellulose suspension or the bath ratio of solids/liquid remains approximately constant or attains a freely selected value.

From the pulper 5 the cellulose suspension is passed through a thick matter pump 7 via a pipe system 8 to a press device 9, whereby the cellulose suspension of water and cellulose is preferably maintained in a temperature range from 60 to 100° C.

In the press device, the cellulose suspension produced by the pulper 5 is for example expressed by rotating rolls 10. The expressed water or press water 11 is collected by a collecting device 11' and passed back to the pulper 5 by a conveying means 12, through an optional filter device 13 and through a mixing device 14 at least in part as water 6. The press device 9 can also be fitted with a suction device (not shown) for drawing off excess water from the cellulose suspension. In this embodiment, the drawn-off water is passed back, as the press water, at least in part to the pulper 5. For the purposes of this invention, drawn-off water or water removed from the cellulose suspension by other means is also press water which can be recycled for the treatment or disintegration of the cellulose.

The filter 13 can comprise one or more surface filters, deep-bed filters, membrane filters, plate filters, edge filters, separators, centrifuges, hydrocyclones, belt filters and vacuum belt filters, tube filters, filter presses, rotating filters, reversible-flow filters, multilayer filters and also flotation methods. In addition, the press water 11 can be osmotically treated in the filter 13; alternatively or additionally metal ions and particles can be filtered out of the press water 11 or metal-binding additives can be fed to the press water 11.

The respective proportions of the returned treatment medium 11 and of fresh treatment medium 15, for example fresh water, fed from another fresh source are adjusted by a mixing device 14 in the water passed to the pulper 5. In addition, the proportion of the treatment medium 11, which is passed or discharged out of the plant 1 through a waste water pipe 16, is set by the mixing device 14.

The mixing device 14 can for example comprise a selector valve or a number of valves. The mixing device 14 is controlled by a control device 17 such that the proportions of the press water 11 and of the fresh water 15 in the water 6 fed to the pulper 5 can be set to variably specifiable values in response to an output signal from the control device via at least one control line 18.

After expressing, the cellulose suspension is transported further through the pipe system 8 to a stirring and conveying means 19 in which a shear stress acting on the cellulose suspension is generated by a stirring or conveying tool 20, such as screws, paddles or blades. For the stirring and conveying means 19, no annular layer mixers can be employed, such as originating from DRAIS Misch- and Reaktionssysteme and sold under the designation CoriMix®. The annular layer mixers are only used for moistening or impregnating dry cellulose materials which are not used in the method described here.

In the region of the shear stresses of the stirring and conveying means 19, in the so-called shear zone, a treatment medium such as tertiary amine oxide, in particular N-methylmorpholine-N-oxide, is supplied to the cellulose suspension in aqueous form with a molar ratio NMMNO/$H_2O$ of between 1:1 and 1:2.5 as solvent for the cellulose via a pipe 21. In addition, additives such as stabilisers and enzymes, organic additives, delustering substances, alkalis, solid or liquid earthy bases, zeolites, finely pulverised metals such as zinc, silver, gold and platinum for the production of antimicrobial and/or electrically or thermally conducting fibres during and after the spinning process and/or dyes can be added to the cellulose suspension in the shear zone. The concentration of the additives can be controlled in the range from 100 to 100,000 ppm referred to the fibre product.

The concentration of the supplied NMMNO depends on the water content of the celluloses 3, 4 currently in the cellulose suspension. The stirring and conveying means 19 acts as a mixer in that the tertiary amine oxide is mixed with the cellulose suspension and the cellulose solution is produced. Then the cellulose solution to which NMMNO has been added is transported via the pipe system 8 to a second stirring and conveying means 22. The stirring and conveying means 22 can comprise a vaporisation stage. From the stirring and conveying means 22 on, the pipe system can be heated. In contrast to the unheated pipe system 8, the heated pipe system in FIG. 1 is given the reference symbol 8'. In particular, a pipe system can be used, as described in WO 01/88232 A1, WO 01/88419 A1 and WO 03/69200 A1. Conveying devices 7' in the form of pumps can be arranged both in the pipe system 8 as well as in the pipe system 8' to transport the cellulose suspension and/or the cellulose solution.

After the addition of the tertiary amine oxide, the metal ion content of the cellulose solution, in particular copper and iron ions, in the pipe 8' and/or in at least one of the shear zones 19, 22, or before and/or after one of the shear zones is measured using the sensors 23, and a signal representing the metal content or the content of individual destabilising metal ions, such as iron, chrome, copper and/or molybdenum is output to the control device 17. Alternatively or in addition to an automatic inline sample extraction, the metal ion content can in a further embodiment be determined after a manual sample extraction using wet-chemical methods in an automatic laboratory analysis device and passed on from there to the control device 17 automatically or manually. However, with a manual sample extraction compared to the automatic inline sample extraction directly from the pipe systems 8, 8', there is the disadvantage that the feedback to the controller for the metal ion content contains a manual process stage and cannot therefore be automated.

The control device 17 compares the metal ion content measured by the sensors 23 with predetermined limits and outputs a signal depending on this metal ion content to the mixing device 14. Due to the control signal to the mixing device 14, the composition of the water 6 as treatment medium passed to the pulper 5 is set in dependence of the content of the destabilising metal ions of the cellulose solution, and the metal content or the content of individual metal ions in the cellulose solution to which tertiary amine oxide has been added is regulated under closed-loop control to a predetermined value. Since the concentration of reactions in the cellulose solution increases after the vaporisation stage, preferably a sensor is provided which monitors the metal content of the cellulose solution after the addition of all constituents and after all the vaporisation stages.

If, for example, the metal content of destabilising metal ions in the cellulose solution, as acquired by the sensors 23 or by using wet-chemical methods, is too high, then the proportion of fresh water in the water 6 fed to the pulper 5 is increased. The metal content is then adjusted by the control device 17 such that it remains below a stability limit of 10 mg/kg. The metal content can also be determined before the formation of the cellulose solution, i.e. still in the cellulose suspension, whereby this measurement is more appropriate than the measurement of the metal content directly in the cellulose solution.

As sensors 23 devices for atomic absorption measurement, mass spectrometers, optical detectors for the acquisition of fluorescence spectra, emission spectra or Raman scattering can be used. These types of sensor are known and are produced by various manufacturers, for example by Perkin Elmer.

Furthermore, the degree of polymerisation of the cellulose suspension and/or the cellulose solution can be determined via inline sensors 23', for example from the company POR-POISE, the number of which is as required, for example via a viscosity measurement. Instead of the inline sensors 23', a sample can be taken manually at the corresponding point and its degree of polymerisation be found in the normal way, for example according to the cuoxam method. Furthermore, as the sensors 23', sensors can be used which monitor the power transferred by agitating machines, such as torque sensors, eddy current sensors or strain-gauge sensors.

As shown in FIG. 1, the sensors 23' for the degree of polymerisation are arranged in the pulper 5 and in the pipe system 8, 8'. The measured degree of polymerisation is passed in signal form to the control device 17. The inline sensors are rheometers from the company PORPOISE.

During the control of the composition of the water 6, the control device 17 takes into account the previously determined metal content of the cellulose 3, 4 passed to the pulper 5. For this, the analysed metal content of individual metal ions or the complete content of metal in the cellulose 3, 4 just used can be entered into the control device 17 and/or its degree of polymerisation via an input device 24. The preadjustment or present default value of the metal content is taken into account in the determination of the proportions of the press water and fresh water in the water fed to the pulper 5. For example, with cellulose having a high metal content a higher proportion of fresh water 15 is passed to the pulper 5 at the start or certain metal-binding additives are mixed into the cellulose suspension.

If the metal content decreases, as it is acquired by the sensors 23 in the cellulose solution to which tertiary amine oxide has been added, below a certain limit which is taken as sufficient for protection against exothermic reactions, for example 10 mg/kg, then the proportion of press water in the water passed to the pulper 5 is increased. Consequently, with sufficient protection against exothermic reactions, less fresh water is consumed and less press water is discharged to the environment.

The control device 17 also controls the residence or processing period of the cellulose 3, 4 in the plant 1 in dependence of the degree of polymerisation as entered manually into the input device 24 or, during operation, determined by the sensors 23' or by means of manually extracted samples analysed in the laboratory. The sensors 23' and/or the laboratory analysis devices for the samples extracted manually act as monitoring devices for the degree of polymerisation. The processing duration of the cellulose from its introduction into the pulper 5 through to its extrusion in an extrusion head 25 is set such that close to the extrusion head 25, shortly before the extrusion of the cellulose solution, the degree of polymerisation does not fall below 450 DP, preferably not below 550 DP. If a cellulose 3, 4 is processed, which already has a low degree of polymerisation, then the transport speed of the cellulose suspension and the cellulose solution in the pipe system 8, 8' is increased, whereby the residence period of the cellulose in plant 1 is reduced.

The control device 17 controls in particular the conveying device 7 which empties the pulper 5. With celluloses having a low degree of polymerisation, the pretreatment and prepulping are shortened by operating the pump 7 at an earlier time. Simultaneously, the conveying capacity of the further pumps 7' in the pipe systems 8, 8' is increased. The duration of the pretreatment in the plant 1 takes, for example with celluloses 3, 4 having a high degree of polymerisation of at least 600 DP, about 40 minutes, and, with celluloses 3, 4 having a relatively low degree of polymerisation of 400 DP and less, at the most 25-30 minutes.

After the agitation and conveying means 22, the now extrudable cellulose solution is passed to the extrusion head 25, which is fitted with a large number of extrusion openings (not shown). The highly viscous cellulose solution is extruded through each of these extrusion openings to form an endless moulded body 2 into an air gap 26. An orientation of the cellulose molecules occurs due to a drawing of the cellulose solution which is still viscous after the extrusion. To achieve this, the extruded cellulose solution is drawn off the extrusion openings by a take-off mechanism 27 with a speed which is greater than the extrusion speed.

After the air gap 26 the endless moulded bodies 2 cross a precipitation bath 28 containing a non-solvent such as water, whereby the cellulose in the endless moulded bodies 2 is precipitated. In the air gap 26, the endless moulded bodies 2 are cooled by a cooling gas flow 29. Here, in contrast to the teachings of WO 93/19230 A1 and EP 584 318 B1, it has been found substantially more advantageous if the cooling gas flow does not impinge on the endless moulded bodies 2 immediately after the exit of the endless moulded bodies 2 from the die, but rather at a distance from the die. In order to achieve the best fibre properties, the cooling gas flow should be turbulent and exhibit a velocity component in the extrusion direction, as described in WO 03/57951 A1 and in WO 03/57952 A1.

The precipitation bath 28 becomes increasingly enriched with tertiary amine oxide, so that it must be continuously regenerated using a recovery device 30. For this, in operation, the liquid from the precipitation bath is fed to the recovery device 30 via a pipe 31, which for example is connected to an overflow on the precipitation bath. The recovery device 30 removes the tertiary amine oxide from the liquid and returns purified water via a pipe 32. Waste substances that cannot be recycled are ejected from the device 1 via a pipe 33 and taken for disposal.

In the recovery device 30, the amine oxide is separated from the water and passed via a pipe 34 to a further mixing device 35, to which fresh amine oxide is fed via a pipe 36. The regenerated amine oxide from the pipe 34 is mixed with the fresh amine oxide 36 and passed via the pipe 21 to the shear zone 19.

Metal ions can be removed from the regenerated amine oxide by an ion exchanger, for example from the company Rohm and Haas, Amberlite GT 73 or filters 37.

The mixing device 35 and the purification device 37 can be controlled by the control device 17 in dependence of the metal ion content as measured by the sensors 23.

Then, the endless moulded bodies are treated further, for example washed, brightened, chemically treated in a device 38 to influence the cross-linking properties, and/or dried and pressed out further in a device 39. The endless moulded bodies can also be processed by a cutting device, which is not shown, to form staple fibres and passed in non-woven form from the device 1.

All of the conveyance of the cellulose solution in the pipe system 8' occurs continuously, whereby buffer containers 40 can be provided in the pipe system 8' to take up variations in the conveyed amount and/or of the conveying pressure and to facilitate continuous processing without the occurrence of dead water regions. The pipe system 8' is equipped with a heating system (not shown) to maintain the cellulose solution during conveyance at a temperature at which the viscosity is sufficiently low for economical transport without decomposition of the tertiary amine oxide. The temperature of the cellulose solution in the pipe section 8' is between 75 and 110° C.

At the same time, the high temperature promotes the homogenisation and uniform mixing, which can be increased by static or rotating mixers.

The residence time of the cellulose suspension or solution in the pipe system 8, 8' from the thick matter pump 7 through to the extrusion head 25 can be, depending on the degree of polymerisation of the processed cellulose and with the use of special additives for the cellulose suspension and cellulose solution, between 5 minutes and 2 hours, preferably about 30 to 60 minutes.

The implementation of the method according to the invention is now described based on experimental examples.

In order that the required enzymatic breakdown or decomposition of the cellulose can be reliably set also in larger plants, the production of the suspension was examined more closely in laboratory experiments, because the mixing and stirring stages occur in a very complex manner and turbulence mechanisms can also affect the rheology of the treated product. Therefore, before transferring to large scale, it was necessary to specifically investigate the enzymatically controlled breakdown behaviour (reduction of DP). In the laboratory model experiments, the parameters (Newton's number, Reynold's number, Froude's number) known in agitation technology were determined. The concentrations, temperatures, mixing times and mixing quality were exactly observed and determined in order to obtain information about the breakdown or decomposition behaviour during the formation of the emulsion or suspension. The exact adjustment of the concentration occurred through continuous flow measurement devices for emulsion or suspension agents, and the addition of the cellulose also occurred continuously, exactly measured via a differential dosage weighing system. The suspension criteria, such as filling level, stirring duration and concentration of the emulsion/suspension particles over the container height were determined by inserting a measurement sampling lance and the extraction of suspended material. An impeller stirrer was used as the stirring element. However, propellers, inclined blade mixers, disc mixers, toothed stirrers, anchor stirrers as well as spiral stirrers or coaxial agitating machines can also be used. The shaft of the stirring machine which is connected to a drive motor is controlled and monitored for speed. Similarly, the monitoring of the drive power, the input energy and the torque occurs during the emulsion and suspension stages for the control of the enzymatic breakdown of the cellulose and thus for the control of the degree of polymerisation.

A first series of experiments involved the cellulose pretreatment for the production of the cellulose suspension and the examination of the press water. In the following reference is made to the schematic illustration of the pretreatment in FIG. 2 and also the reference symbols of FIG. 1 are used.

EXPERIMENTAL EXAMPLE 1

In a process step A cellulose 3, 4 (cf. FIG. 1) of type MoDo Dissolving Wood Pulp, pine sulphite wood pulp, was placed in a pulper 5 from the company Grubbens having a net filling volume of 2 m$^3$ with water 6 in a mixing ratio of 1:17 (solid density 5.5%). The cellulose exhibited a cuoxam DP of 650 and an α-cellulose content greater or smaller than 95%. Commercially available celluloses based on hardwood or softwood can be used. Hemicellulose contents in the cellulose in the range from 2 to 20% can also be processed in the method. Other possible celluloses are Sappi Eucalyptus, Bacell Eucalyptus, Tembec Temfilm HW, Alicell VLV and Weyerhäuser α-cellulose of less than 95%. The fed water 6 consisted of 30 parts of fully desalinated fresh water 15 and 70 parts of press water.

Under vigorous stirring, technically pure formic acid 50 in the ratio of 1:140 and a liquid enzyme preparation 51 in the ratio of 1:200, referred in each case to the cellulose content, were added. An enzymatic pretreatment was then carried out for a duration of about 35 minutes until a homogeneous cellulose suspension was obtained. A cellulase enzyme complex, such as for example Cellupract® AL 70 from Biopract GmbH or Cellusoft from Novo Nordisk can be used as the enzyme preparation 52.

Then, the pretreatment was interrupted in a process step B by the addition of sodium hydroxide solution (soda lye) 52 in the ratio of 1:500 referred to the cellulose content of the cellulose suspension in the pulper 5.

The cellulose suspension was then dehydratised to about 50% in a process step C in a vacuum belt filter acting as press means 9 followed by an expressing system from the company Pannevis, so that the expressed cellulose exhibited a dry content of about 50%. From step C, the expressed cellulose was then passed on via the pipe 8 for production of the cellulose solution containing NMMNO, water and cellulose. These steps are not shown in FIG. 2 for the sake of clarity.

The press water was collected in the press means 9 and led away via the pipe 11 (cf. FIG. 1). Approximately 75% of the press water was fed back to the pulper 5 and about 25% of the press water was passed via the pipe 16 to a waste water purifier.

The degree of polymerisation of the cellulose was always selected such that a DP (degree of polymerisation) of about 450 to about 550 was obtained in the spinning solution. The cellulose concentration was set to about 12% in the spinning solution.

The press water remaining in the system 1 was again mixed in a mixing device 14 (cf. FIG. 1) in a process step D with the fully desalinated water, as described above.

EXPERIMENTAL EXAMPLE 2

In another experiment, all the steps of Experimental Example 1 were repeated, except that in process step A, the quantity of the added enzyme preparation was reduced to 1:125 referred to the cellulose content of the cellulose suspension.

EXPERIMENTAL EXAMPLE 3

In another experiment, the steps of Experimental Examples 1 and 2 were repeated, except that in process step A no enzyme preparation was added.

RESULTS OF THE EXPERIMENTAL EXAMPLES 1 TO 3

To check the effectiveness of the method according to the invention, the press water collected during the expressing stage was analysed for copper and iron ion content and additionally the chemical oxygen demand was determined.

As a result of this experiment, it can be summarized that, in the first pulp cycles, the measured values of the ingredients increase due to the circulation of a part of the press water. Since, however, a part of the press water is permanently transferred out together with the ingredients dissolved therein, a steady state sets in after some time in which the amount of ingredients or content substances, in particular the metal ions, remains constant.

In total about 10% of the iron ions introduced by the cellulose 3, 4 and about 40% of the copper ions introduced by the cellulose was removed by the press water feedback. In a continuous plant operation with a return of the press water, the percentage proportion of the iron extracted from the system 1 may be between 22% and 35% referred to the quantity of iron introduced by the cellulose.

Figure 3:
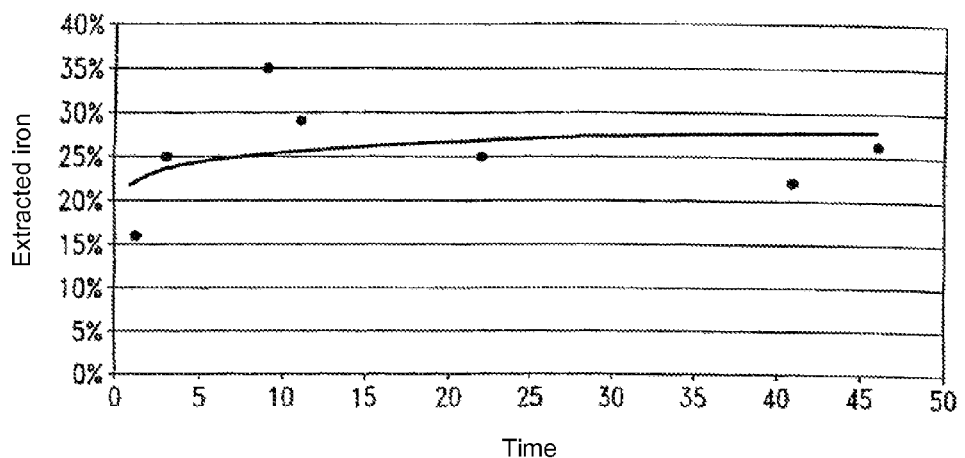
FIG. 3 a schematic illustration of the change of the quantity of iron ions borne out over time.

FIG. 3 gives a schematic temporal trace of the iron ion extraction.

The stable final state of the system 1 is achieved, as Experimental Examples 1 to 3 show, independent of the amount of introduced enzymes for the pretreatment of the cellulose.

Figure 4:
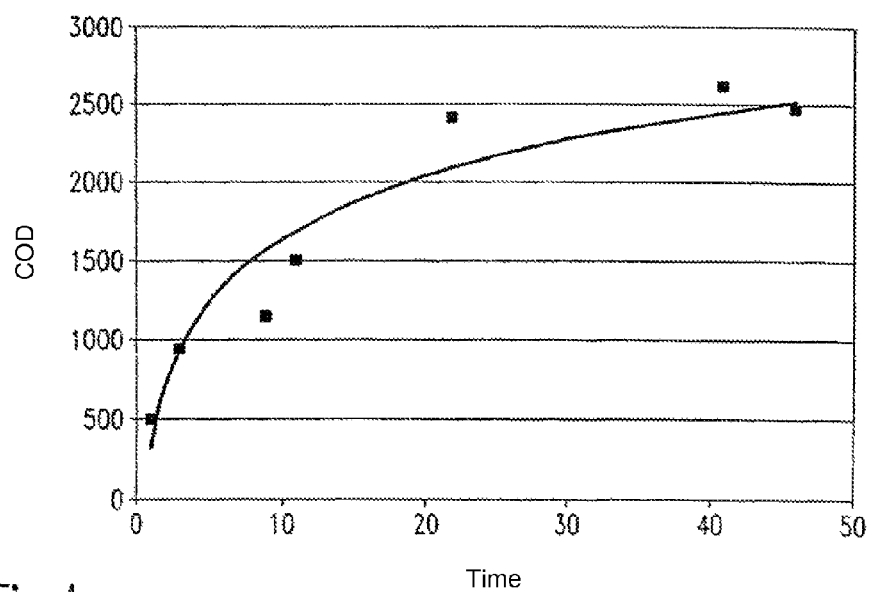
FIG. 4 a schematic illustration of the chemical oxygen demand in the press water over time.

This is also confirmed by the temporal change of the chemical oxygen demand (COD), as illustrated in FIG. 4. The chemical oxygen demand was determined in the press water according to DIN 38409 and approximates with increasing duration of the press water feedback to a constant value.

Furthermore, the degree of polymerisation and the DP reduction as well as the onset temperature of the spinning solution were determined as indicators of stability in the cellulose solutions obtained according to Experimental Examples 1 to 3. The results of the experimental examples are shown in Table 1.

TABLE 1

| Experimental Example | DP reduction [%] | $T_{onset}$ °C. |
|---|---|---|
| 1 | 27.5 | 165 |
| 2 | 27 | 165 |
| 3 | 9 | 160 |

As shown in Table 1, the cellulose solution obtained through press water feedback is stable and exhibits an onset temperature of at least 160° C. The onset temperature shown in Table 1 according to the method with press water return according to the invention is also above the onset temperature as it is obtained by the method of WO 95/08010, and in practice is about 150° C.

Based on these investigations, it can be seen that despite the press water feedback, the onset temperatures still lie above the onset temperatures for the dry processing of cellulose and can be increased by an enzymatic pretreatment of the cellulose. This means that the press water feedback is suitable for industrial use.

In another series of experiments the effect of the substances contained in the press water on the stability of the cellulose solution was investigated. To achieve this, a concentrate of 5 l of press water in the ratio 1:270 was added to the cellulose solution in each of the Experimental Examples 1 and 3 and feedback of the press water was omitted.

In both cases, once according to the method of Experimental Example 1 without enzymatic pretreatment and once according to the method of Experimental Example 3 with enzymatic pretreatment, a reduction of the onset temperature to about 141° C. occurred in each case due to the press water concentrate. Thus, it is demonstrated that the press water fundamentally reduces the stability of the cellulose solution.

This destabilisation of the cellulose solution can however be prevented by the outward transfer of the treatment medium with the destabilising metal ions. The proportion of the returned treatment medium depends on the type of cellulose used, as shown in the following table.

The iron and copper content as well as the metal ion content of the cellulose overall varied noticeably with the various types of cellulose, as can be seen from Table 2. The metal content of the various types of cellulose was determined by incineration in the platinum crucible according to DIN EN ISO 11885 (E22) and with flame AAS.

TABLE 2

| | Used cellulose | | | | | | | |
|---|---|---|---|---|---|---|---|---|
| Contained substances in cellulose | Cellulose 1 mg/kg | Cellulose 2 mg/kg | Cellulose 3 mg/kg | Cellulose 4 mg/kg | Cellulose 5 mg/kg | Cellulose 6 mg/kg | Cellulose 7 mg/kg | Cellulose 8 mg/kg |
| Fe | 1.3 | 2.0 | 1.6 | 5.8 | 2.2 | 2.6 | 14 | 13 |
| Mn | <0.3 | <0.1 | 0.2 | 0.33 | n.d. | <0.3 | 0.4 | <0.3 |
| Mg | 2 | 2 | 226 | 32 | 138 | 2 | 21 | 7.8 |
| Co | 0.3 | <0.3 | <0.3 | <0.3 | <0.3 | <0.3 | <0.3 | <0.3 |
| Ca | 54 | 4 | 37 | 64 | 30 | 6 | 130 | 27 |
| Cr | <0.3 | <0.3 | 1.4 | <0.3 | <0.3 | 0.4 | <0.3 | <0.3 |
| Mo | <0.3 | <0.1 | <0.1 | <0.1 | <0.3 | <0.3 | <0.3 | <0.3 |
| Ni | <0.3 | <0.3 | <0.3 | <0.3 | <0.3 | <0.3 | <0.3 | <0.3 |

TABLE 2-continued

| Contained substances in cellulose | Cellulose 1 mg/kg | Cellulose 2 mg/kg | Cellulose 3 mg/kg | Cellulose 4 mg/kg | Cellulose 5 mg/kg | Cellulose 6 mg/kg | Cellulose 7 mg/kg | Cellulose 8 mg/kg |
|---|---|---|---|---|---|---|---|---|
| Cu | 0.3 | <0.2 | 0.2 | <0.3 | <0.3 | <0.3 | 0.3 | 0.3 |
| Na | 396 | 48 | 93 | 92 | 263 | 176 | 335 | 8.2 |

Figure 2:
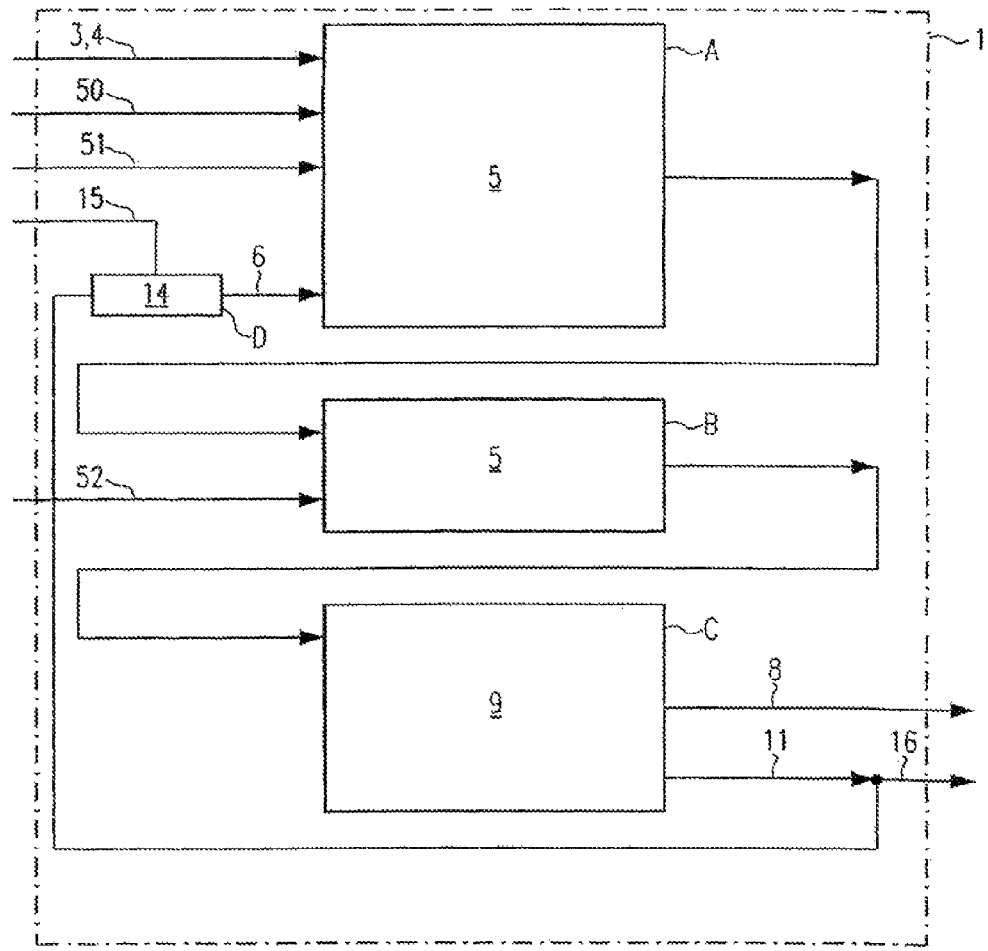
FIG. 2 a schematic illustration of the steps of the method for the production of the cellulose suspension.
Figure 5:
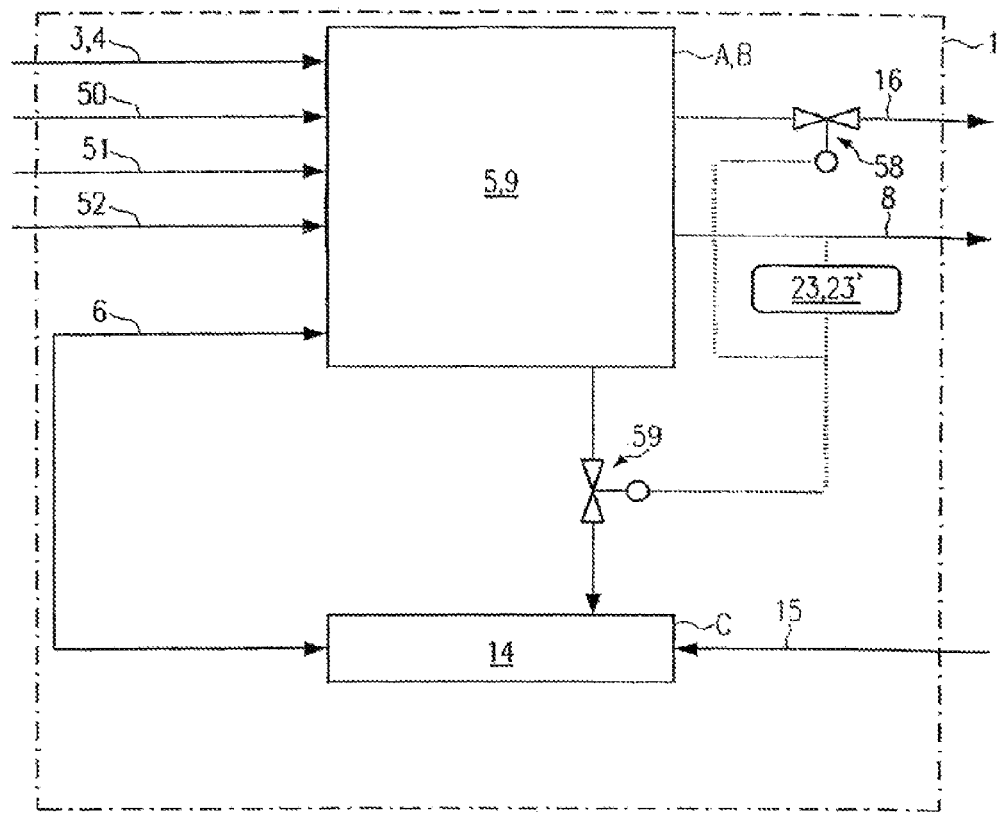
FIG. 5 a schematic illustration of a first method for the control of the metal ion content.

In a final series of experiments the schematic experimental set-up of FIG. 5 was used. In FIG. 5 the reference symbols of FIGS. 1 and 2 are used for elements with similar or the same function.

With the set-up in FIG. 5 the amount of press water returned to the pulper 5 was adjusted to the iron and copper content of the expressed cellulose.

With the arrangement of FIG. 5, the iron ion and copper ion content was measured as representative values for the metal ion content by the sensors 23, 23' (cf. FIG. 1).

Due to the control of the proportion of the press water in the water 6 fed to the pulper 5, the iron concentration was maintained as closely as possible below 10 mg/kg absolutely dry and the copper concentration just below 0.5 mg/kg absolutely dry. These values were possible for an adequate stability of the cellulose solution in the pipe 8 with simultaneous maximum retention of the press water within the system 1 and consequently with minimum outward transfer of the press water 16 from the system 1.

The control of the metal ion content occurred in such a way that if one of these two limits was exceeded, the amount of press water outwardly transferred from the system 1 and passed on for waste water purification was increased by opening a valve 58. At the same time, closure of the valve 59 reduced the proportion of press water fed back in the pretreatment stage.

If a direct pulping of the cellulose 3, 4 occurs in amine oxide, then the setting of the metal ion content according to the invention can also be achieved via the tertiary amine oxide recovered from the spinning bath 28. In this respect the degree of purification on the metal ion filter 37 and/or the proportion of the tertiary amine oxide 36 freshly added to the regenerated tertiary amine oxide 34 can be set in dependence of the metal ion content as measured by the sensors 23 and 23', as well as in dependence of the metal ion content previously found in the cellulose 3, 4. The control functions similarly as with the press water feedback.

In a modification of the method described in FIG. 1, in the recovery device 30 recovered water from the spinning bath 28 can be returned instead of or together with the press water to the pulper 5.

The metal ion filter 37, as it is used in the recovery of the tertiary amine oxide from the spinning bath 28, can of course also be used for the purification of the returned press water.

EXPERIMENTAL EXAMPLE 4

In this experimental example, the method was carried out according to Experimental Example 1 and the DP value in the cellulose was measured at various points in the enzymatic treatment, in the cellulose suspension and in the cellulose solution. Table 3 shows the figures obtained. From this table it can be seen that through to the extrusion of the endless moulded body the degree of polymerisation is reduced by 20% from originally 628 in the cellulose 3, 4 to 504. A substantial proportion of the reduction in the degree of polymerisation is provided by the enzymatic pretreatment, which in addition offers the advantage that its duration correlates well with the polymerisation breakdown. The reduction in the degree of polymerisation can be prevented in a simple manner if the duration of the enzymatic treatment is set such that for example a degree of polymerisation of at least 590 DP to 600 DP is present at the end of the enzymatic treatment. Furthermore, the transport of the cellulose suspension and/or the cellulose solution can be speeded up such that a degree of polymerisation of at least 550 DP is obtained before the extrusion of the cellulose solution.

TABLE 3

|  | DP value | Overall reduction |
|---|---|---|
| Cellulose | 628 | 0% |
| Enzymatic treatment 30 minutes | 603 | 4.14% |
| Enzymatic treatment 45 minutes | 592 | 5.73% |
| Enzymatic treatment 60 minutes | 582 | 7.32% |
| Cellulose suspension | 582 | 7.32% |
| Cellulose solution | 538 | 14.33% |
| Endless moulded bodies | 504 | 19.75% |

EXPERIMENTAL EXAMPLE 5

In this experiment the method was implemented similar to Experimental Example 4, but only the activation step was observed and the DP value in the cellulose suspension, in the spinning solution and in the endless moulded body was not measured.

The starting cellulose was selected with a DP of 780 and the enzyme concentration was increased by the factor 0.5. Furthermore, the power consumption of the agitating machine was also recorded during the activation step and scaled to the container volume and the solids concentration. Table 4 shows the figures measured when carrying out the experiment.

TABLE 4

| Step in the method | Treatment time [s] | Power consumption [kW/m³ of input liquid] | Cellulose content [%] | Power transferred [kW/kg of cell.] | DP of cell. |
|---|---|---|---|---|---|
| Input liquid | 300 | 0.4 | 0 | — | — |
| Cellulose feed 1 | 360 | 0.49 | 1.0% | 0.0049 | 780 |
| Cellulose feed 2 | 420 | 0.52 | 2.0% | 0.0104 | 780 |
| Cellulose feed 3 | 480 | 0.8 | 3.0% | 0.0240 | 780 |
| Cellulose feed 4 | 540 | 1.81 | 4.0% | 0.0724 | 780 |
| Cellulose feed 5 | 600 | 2.55 | 5.0% | 0.1275 | 780 |
| Homogenisation | 660 | 2.53 | 5.0% | 0.1265 | 780 |
| Homogenisation | 720 | 2.4 | 5.0% | 0.1200 | 780 |
| Homogenisation | 780 | 2.5 | 5.0% | 0.1250 | 780 |
| Enzyme addition | 780 | 2.51 | 5.0% | 0.1255 | 780 |
| Homogenisation | 840 | 2.53 | 5.0% | 0.1265 | 780 |
| Homogenisation | 900 | 2.5 | 5.0% | 0.1250 | 773 |
| Homogenisation | 960 | 2.41 | 5.0% | 0.1205 | 765 |
| Homogenisation | 1020 | 2.3 | 5.0% | 0.1150 | 751 |

TABLE 4-continued

| Step in the method | Treatment time [s] | Power consumption [kW/m³ of input liquid] | Cellulose content [%] | Power transferred [kW/ kg of cell.] | DP of cell. |
|---|---|---|---|---|---|
| Homogenisation | 1080 | 2.17 | 5.0% | 0.1085 | 747 |
| Homogenisation | 1380 | 1.88 | 5.0% | 0.0940 | 701 |
| Homogenisation | 1680 | 1.65 | 5.0% | 0.0825 | 657 |
| Homogenisation | 1980 | 1.52 | 5.0% | 0.0760 | 613 |
| Homogenisation | 2280 | 1.5 | 5.0% | 0.0750 | 569 |
| Homogenisation | 2580 | 1.45 | 5.0% | 0.0725 | 522 |

Figure 6:
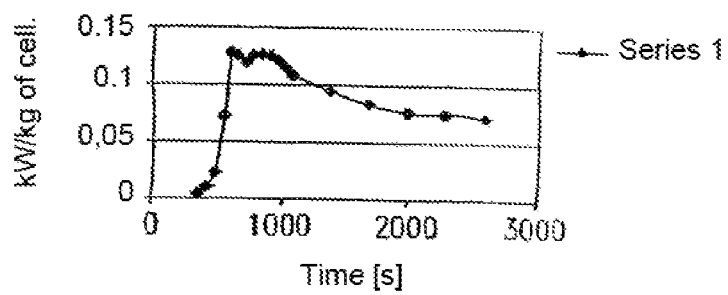
FIG. 6 a schematic illustration of the power transfer of an agitating machine for a cellulose suspension over the residence time.
Figure 7:
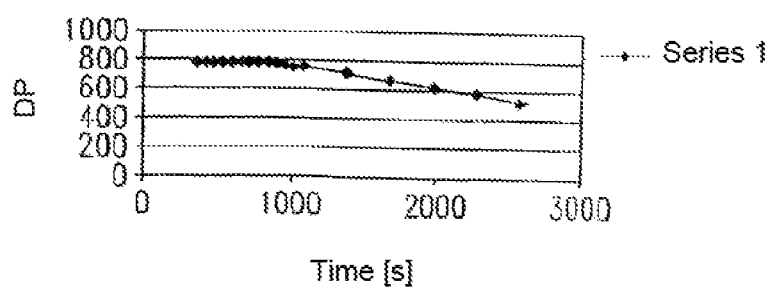
FIG. 7 a schematic illustration of the reduction in the degree of polymerisation over the residence time for the cellulose suspension.

FIG. 6 illustrates the trace of the power in kilowatts per kilogram of cellulose applied by the agitating machine over the treatment period of the cellulose suspension in the agitating machine. FIG. 7 shows the change of the degree of polymerisation in the agitating machine.

As can be seen from Table 4 and FIGS. 6 and 7, the degree of polymerisation reduces with increasing treatment time for the cellulose suspension.

The reduction in the degree of polymerisation can be seen from the clearly reduced power applied by the agitating machine. With a reduced degree of polymerisation the power applied in the agitating machine also reduces.

Consequently, during the production of the cellulose suspension, in particular during the enzymatic pretreatment, in the agitating machine the power of the agitating machine can be used as a representative quantity for the degree of polymerisation in the control of the degree of polymerisation. The same method for monitoring the degree of polymerisation is also possible with the following agitating machines. If, for example, the power of the agitating machine falls under a certain predetermined value, e.g. a limit determined by experiments, this is a sign that the degree of polymerisation is falling or has fallen below a figure specified for this processing stage. As a consequence, the remaining residence time of the cellulose suspension and/or the cellulose solution in the process step is shortened.

What is claimed is:

1. A method for producing Lyocell fibers comprising
   introducing a cellulose with a predetermined degree of polymerization, producing a cellulose solution, or initially a cellulose suspension and from this then the cellulose solution, from the cellulose with the addition of a treatment medium, extruding the cellulose solution to form endless molded bodies;
   monitoring the degree of polymerization of the cellulose, the cellulose suspension, the cellulose solution or combination thereof;
   setting the residence time of the cellulose to be 80 min at the most in dependence of the degree of polymerization from its introduction through to its extrusion; and
   setting the measured degree of polymerization of this cellulose solution shortly before extrusion to a DP value of at least 400 DP.

2. The method according to claim 1, wherein the cellulose suspension is subjected to an enzymatic pretreatment.

3. The method according to claim 2, wherein the duration of the enzymatic pretreatment is adjusted in dependence of the degree of polymerization of the introduced cellulose.

4. The method according to claim 3, wherein the enzymatic pretreatment for a cellulose with a lower degree of polymerization is carried out over a shorter time than for a cellulose with a higher degree of polymerization.

5. The method according to claim 2, wherein the enzymatic pretreatment is set between 20 minutes and 80 minutes.

6. The method according to claim 2, wherein for the enzymatic pretreatment at least one cellulase enzyme complex is added to the cellulose suspension.

7. The method according to claim 1, wherein the cellulose solution is conveyed through a heated pipe system for extrusion and that the conveying speed of the cellulose solution in the pipe system is set in dependence of the degree of polymerization.

8. The method according to claim 7, wherein during the processing of a cellulose with a lower degree of polymerization in the cellulose solution the conveying speed of the cellulose solution is set higher than the conveying speed during the processing of a cellulose in the cellulose solution with a higher degree of polymerization.

9. The method according to claim 1, wherein the residence time of the cellulose from its introduction through to its extrusion in the cellulose solution is at least five minutes.

10. The method according to claim 1, wherein a conveying speed of a pump arrangement conveying the cellulose suspension, the cellulose solution or combination thereof is set in dependence of the degree of polymerization in the cellulose, the cellulose suspension, the cellulose solution or combination thereof.

11. The method according to claim 1, wherein the degree of polymerization of the cellulose solution shortly before the extrusion is set to a DP value of at least 450 DP to 550 DP.

12. The method according to claim 1, wherein the duration of an enzymatic pretreatment of the cellulose is set such that its DP value is at least 500 immediately after termination of the enzymatic pretreatment.

13. The method according to claim 1, wherein the power of an agitating machine is monitored as a representative quantity for the degree of polymerization of the cellulose suspension.

\* \* \* \* \*